Nov. 10, 1953 L. PREMOLI 2,658,748
VEHICLE SPRING SUSPENSION SYSTEM
Filed April 2, 1952 2 Sheets-Sheet 1
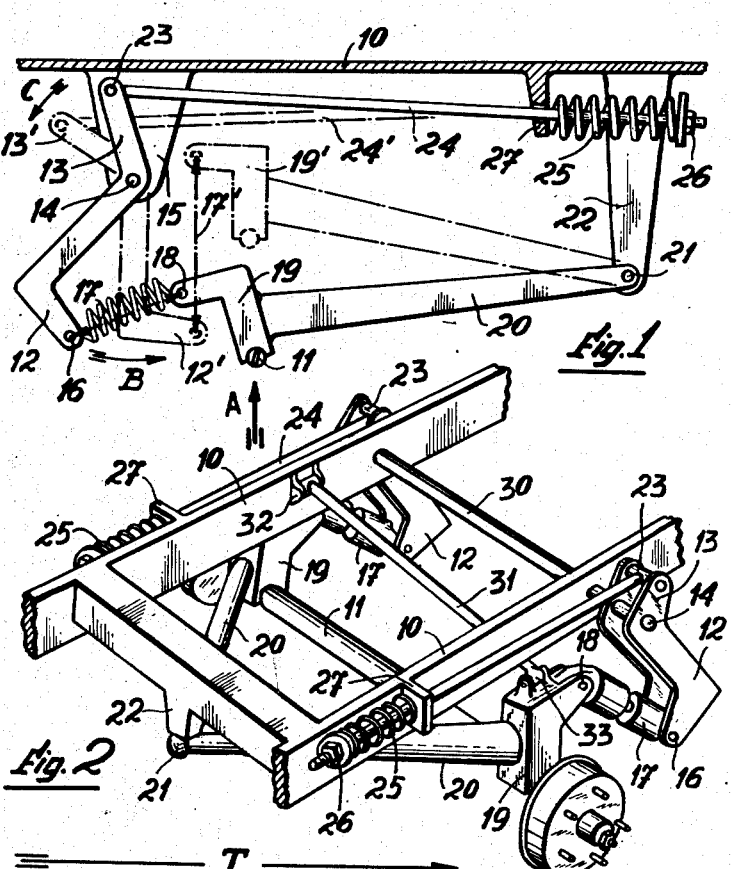
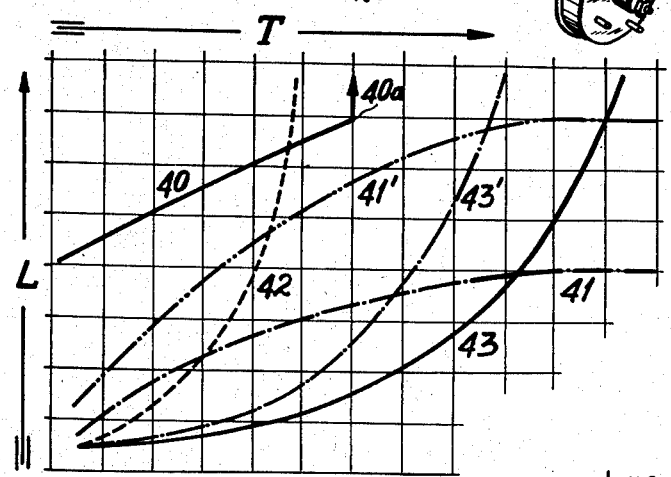
INVENTOR.
LUIGI PREMOLI
BY Nov. 10, 1953  L. PREMOLI  2,658,748
VEHICLE SPRING SUSPENSION SYSTEM
Filed April 2, 1952  2 Sheets-Sheet 1
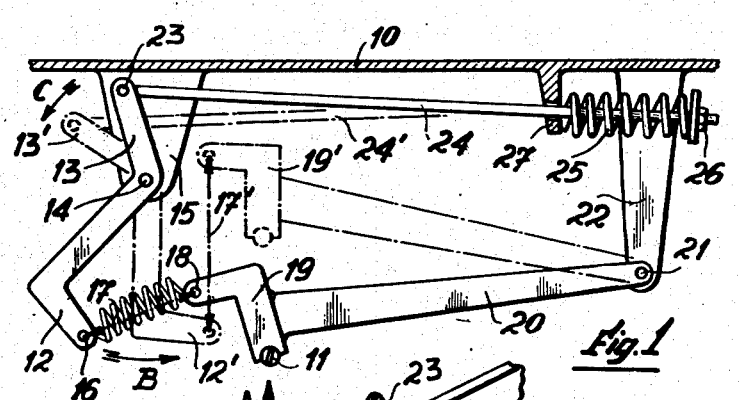
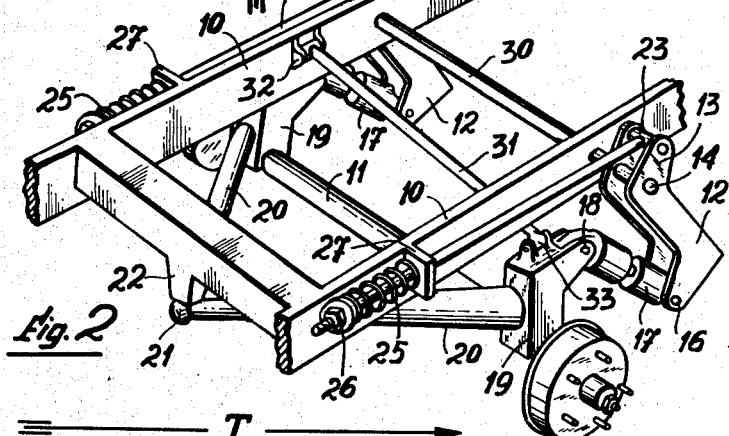
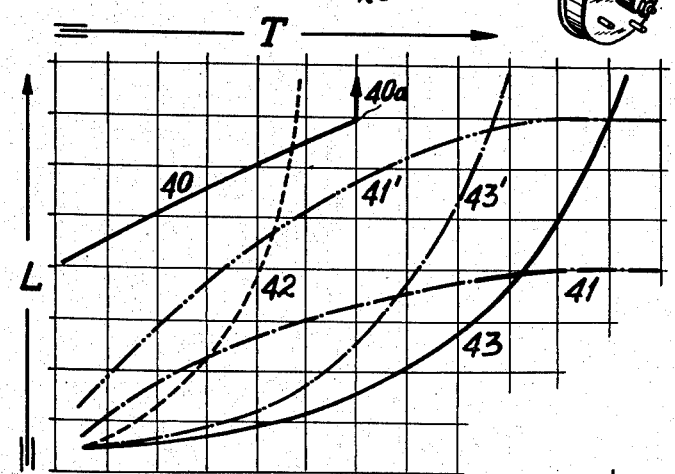
INVENTOR.
LUIGI PREMOLI
BY Patented Nov. 10, 1953

2,658,748

UNITED STATES PATENT OFFICE 2,658,748

VEHICLE SPRING SUSPENSION SYSTEM

Luigi Premoli, Milan, Italy

Application April 2, 1952, Serial No. 280,133

Claims priority, application Italy June 24, 1948

8 Claims. (Cl. 267—20)

This my invention relates to vehicle spring suspension systems particularly designed for heavy road vehicles such as trucks, busses, tow-trucks, trailers and so on, and further for agricultural and military trucks, armoured cars, and for any other type of vehicle wherefor a spring suspension having high shock absorbing characteristics may be requested or desired most.

More particularly my invention is related to certain new and useful improvements in or relating to spring suspension systems for vehicles of the above character. A vehicle suspension according to the present invention comprises elastic means and interconnected movable members to resiliently connect the wheel axle to the vehicle body, and particularly of the type disclosed in my co-pending application for Letters Patent Serial Number 99,910, filed June 18, 1949, now abandoned, for "System of Elastic Suspension for Vehicles," of which the instant application is a continuation-in-part, as to common subject matter, and wherein I have described and claimed an elastic suspension for a vehicle body comprising, in combination, a lever pivotally connected to the vehicle body, an elastically extensible link pivotally connected to the free end of said lever and the wheel axle, said lever being pivotable between two terminal positions corresponding to a vertical and a horizontal position of said link, respectively, and an elastic means connected to the vehicle body and to said lever and tending to rotate said lever towards the terminal position at which said links extend horizontally.

Several devices have been heretofore planned and constructed to provide vehicles of the above character with spring suspension systems intended to absorb the shocks imparted to the vehicle body by the irregularities and chiefly by sharp-edged hollows in the road and ground surface, and to minimize the effects thereof. It is known to those skilled in the art that a proper shock absorbing effect may be attained only by providing the vehicle with a spring suspension which allows a relatively ample travel along a nearly vertical path of the wheel axles in respect to vehicle body, and which resists statical and dynamical regular or casual loads by urging downwardly the wheel axle with an elastic force which progressively increases as the said axle moves upwardly.

In my application Serial No. 99,910, filed June 18, 1949, I have disclosed a spring suspension which may elastically resist said loads and which is responsive to positive and negative increments of statical or dynamical loads in a truly progressive manner nearly in accordance to the most desirable theoretical requirements.

It is further known that spring suspensions having said characteristic are subject to some common objections, and in particular suspensions of this type are subject to excessive tilting of the vehicle body due to the centrifugal force in curves. Also, road surface irregularities encountered by the wheels on one side only of the vehicle impart to the elastically supported masses some lateral impulse. Several attempts have been heretofore made to overcome said objections, in general by the provision of linking means compelling one end of wheel axle to substantially repeat the vertical movements of the other end thereof. The known arrangements however, prevent the wheels at one side of the vehicle to properly "follow" the holes in the road surface, where no such holes are encountered by the wheels on other side, causing "falling" of the vehicle into holes and imparting a severe shock to the vehicle body and to passengers.

The principal object of this my invention is to provide a new and improved vehicle spring suspension system which is not subject to said disadvantages and, in rather more detail, to provide a new and improved vehicle spring suspension including two separate elastic means having different yielding characteristics.

It is also an object of the present invention to provide a wheel suspension in which the load is applied to at least one of the elastic means at a varying angle so that the elastic suspension is progressively responsive to load variations.

It is another object of the present invention to provide on one or any wheel axle of the vehicle two parallel and equal spring suspension assemblies of the above type comprising at least two separately acting spring means interconnected by a movable lever. It is an important object of the present invention to interconnect the movable levers of said two assemblies, so that as one of said levers moves the other one is compelled to substantially repeat the movements thereof, while the spring means linking said levers to the wheel axle however maintain their full operative capacity in respect to independent shock absorption and particularly force the wheels to properly and promptly follow the road surface.

Another object of this invention is to provide, in a spring suspension system of the character referred to above, simple and efficient guiding means to guide the wheel axle in a fixed nearly vertical path, to prevent lateral movements thereof and further to allow said wheel axle to freely tilt in a transversal vertical plane as requested to absorb the unevenly encountered irregularities of the road or ground surface and to minimize the effects thereof.

A further object of this my invention is to provide in a spring suspension system substantially as above elastically extensible links in which compression working chained coil springs are comprised.

These and other objects of this invention, which will be apparent to those skilled in the art as this description proceeds, and the advantages thereof will be fully understood when reference is made to the following more detailed description of the general features and of the operation of my improved spring suspension system, and of one preferred form of embodiment thereof, disclosed by way of example of the invention, when taken in conjunction with the accompanying drawings, wherein:

Figure 1 is a diagrammatical lateral view in elevation of a spring suspension assembly;

Figure 2 is a perspective diagrammatical view of one embodiment of said improved spring suspension system comprising two spring suspension assemblies of the type shown in Figure 1;

Figure 3 is a simplified diagram showing the general operative characteristics of the several spring means;

Figure 4 is an elevational and partly sectional view of the above mentioned embodiment of this invention, and Figure 5 is a plan view thereof, wherein the parts comprised in the vehicle frame are shown in dotted lines to make the characteristic features of the invention apparent.

Throughout the figures equivalent parts are indicated by the same reference numerals and, in general, numerals 10 and 11 indicate the vehicle body (limited in the drawings to the frame thereof) and the wheel axle, respectively.

Referring first to Figure 1: a two-armed lever having one lower angularly shaped arm 12 and one upper arm 13 is pivotally connected at 14 to a frame or supporting member 15 made integral with the vehicle frame 10. The free end of said lower arm 12 is pivotally connected at 16 to an end of an elastically extensible link member 17 the other end of which is pivotally connected at 18 to a rigid angularly shaped member 19 which is fixedly secured to the wheel axle 11. The rigid member 19 and, consequently, the wheel axle 11 are forced to move along a fixed nearly vertical path by any suitable guiding means, for example by a substantially horizontal arm lever structure 20 which is fixedly connected with said member 19 at the free end thereof and pivotally connected at 21 at its other end to a member 22 made integral with the vehicle frame 10.

The free end of said upper arm 13 of said two-armed lever is pivotally connected at 23 to a linking rod 24 which connects the said upper arm 13 of said two-armed lever to an elastic means which tends to rotate said lever towards its terminal position at which said elastically extensible link member 17 extends nearly horizontal. In a preferred embodiment of the invention, the said elastic means is constructed in form of a coil spring 25 abutting at its ends on and compressed between a stop means 26 fixedly or adjustably secured to the free end of said linking rod 24 and an opposite stop 27 made integral with the vehicle frame 10 and pivotably supporting the elongated member 24. In Figure 1, the said elastically extensible link member 17 is constructed as a helical spring. A most preferred form of embodiment of said elastically extensible link member 17, which has been proved satisfactorily in severe road and ground tests will be hereinafter described in detail with reference to Figure 4.

Further, in said Figure 1 the movable parts and members comprised in the above described combination are shown in full lines in the position of "no load" at which the said elastically extensible link member 17 extends nearly horizontal and, in rather more detail, in aligned relationship with the pivotal connection 21 of guiding arm lever structure 20. As any static or dynamic load is applied to the vehicle body and tends to drive it towards the ground, or any irregularity of the road or ground surface imparts to the wheels upwardly directed shocks, the said wheel axle 11 moves upwardly in direction A tending to extend the said elastically extensible link member 17 and to rotate the said lower arm 12 of two-armed lever in direction B, and consequently the upper arm 13 of same lever in direction C, and finally to compress the coil spring 25 through the tension applied to the linking rod 24. In Fig. 1 the said movable parts are further indicated in dotted lines at the position of "full load," wherein member 19 is raised up to position 19', the two-armed lever 12, 13 appears as swung in direction B, C to a nearly vertical position 12', 13' whereby the said elastically extensible link member 17 reaches the vertical position 17', and the said linking rod 24 is moved to position 24' for urging the coil spring 25 into compressed condition (not shown). The said two positions of the several movable members and parts illustrated by full lines and by dotted lines respectively represent the terminal positions of the suspension system.

Referring now to Figure 3, it will be readily understood that in a spring suspension assembly constructed as shown in Figure 1, the elastically extensible link means 17 and the elastic means 25 tend to move downwardly the wheel axle 11 in direction opposite to A in the following manner:

Supposing that the elastic means 17 and 25 comprise both compression working coil springs, the springs resist loads with a resiliency which increases in a substantially rectilinear manner in respect to the loads applied to their ends, i. e. the travel "T" of one end of such springs in respect to the other end thereof corresponds to the increment of the applied load as a rectilinear function of the type represented by line 40 in diagram of Figure 3, wherein the arrow 40a indicates the rising of the load to indefinite value as the spring is fully compressed. In the case of resistance of said two-armed lever against movement in direction C, B, due to the resiliency of coil spring 25 transmitted to point 23 of said lever through said linking rod 24, the increment of resistance during travel "T" from terminal position 12, 13 to terminal position 12', 13' varies as a function of the type represented by curve 41 of diagram, so that it will be apparent that an increment exists but at a progressively decreasing incremental ratio. At least, the resilient power opposing at point 18 the loads applied to wheel axle or to vehicle body in direction A or in direction opposite to A, respectively, varies as a function both of the resiliency of the coil spring or coil springs comprised in the elastically extensible link means 17, and of the inclination of said link means in respect to vertical direction in which said loads are applied, owing to the variation of the vertical component of the line between points 16 and 18 which said link means tends to approach. Curve 42 in said diagram is representative of the character of said double function, and said curve makes apparent the high incremental ratio of said variation. Consequently the static or dynamic load "L" required to move the wheel axle 11 during its travel "T" from lowermost position of the member 19 to its uppermost position 19' increases as a function of the type represented in the diagram by curve 43, which is representative of the total load supporting elastical characteristic of a spring suspension assembly according to the present invention.

In said diagram of Figure 3, the line 40, and the curves 41, 42 and 43 are merely representative of the general character of the functions referred to above. The values and also the ratio of scale of "T" in respect to scale of "L" may be varied according to the various requirements of practical application of the device, by properly designing the power of springs and the initial load thereof, and the spacing and the angles of the described parts.

I attain the above said principal object of this my invention by constructing a vehicle spring suspension system comprising the combination of operative parts, members and devices shown in diagrammatical manner in Figure 2, wherein the said system comprises two parallel and equal spring suspension assemblies each one of which comprises the combination and the operative arrangement of parts shown in Figure 1, the said assemblies being disposed at the two sides of the vehicle frame 10 (represented by its longitudinal beams only) and arranged to act on members 19 made integral with the wheel axle 11 at or near the ends thereof. The guiding arm lever structure comprises two braces 20 converging and connected at one end thereof with a pivotal preferably spherical connection 21 to member 22 which is made integral with the vehicle frame. The other ends of the braces 20 are secured to the members 19 of two said assemblies. For preventing lateral movements of wheel axle 11 in respect to vehicle 10 a connecting rod 31 is provided, which extends horizontal and transversely to the vehicle frame, the ends of said connecting rod 31 being pivotally (preferably by spherical joints) connected at 32 and at 33 to one lateral beam of the vehicle frame and to member 19 on the side other than said beam, respectively. Owing to said connection, the movable assembly comprising wheel axle 11 and members 19 is compelled to move only in a nearly vertical path, along an arc having its centre at 32, the lateral component of said arc being small.

According to this invention, the vehicle spring suspension system comprises a connecting means, a torsion resisting shaft 30, for example, for turnably connecting the pivotable arm lever 12, 13 of one spring suspension assembly to the corresponding arm lever of the other assembly. The said shaft 30 may be substantially rigid to compel one said lever to completely repeat the movements of the other one if desired, or said shaft 30 may be designed to allow a certain rotative motion of one end thereof in respect to its other end upon overcoming of a certain torsional elastic resistance, as it may be convenient for relatively small vehicles in order to allow a certain difference of inclination of said arm levers.

In consequence of said rotative connection by said shaft 30, the total lifting power of any single assembly will be different in the case in which the static or dynamic loads are unevenly distributed on the two wheels or on the two pairs of coupled wheels mounted on and about the two ends of wheel axle 11 as compared to the case in which said load is equally distributed on said wheels or pairs of wheels. A consideration of diagram of Figure 3 will make this clear. Supposing the resilient power of elastic means 25 is doubled, the load values will be correspondingly doubled and a new representative curve as illustrated at 41' will be obtained, and the said total elastic characteristic of the assembly will be modified as generally indicated by curve 43' in respect to curve 43.

From the above it will be apparent that if the loads are applied at both sides of the vehicle, the whole spring suspension assembly will be responsive to the loads in a very sensitive manner, because the partial loads on any wheel or pair of wheels will be transmitted to the vehicle body through the one elastic link means 17 and the one elastic means 25 of the spring assembly arranged on the corresponding side of the vehicle. On the contrary, if a load is applied to one wheel or pair of wheels on one side of the vehicle, the corresponding assembly will be elastically responsive in a manner as illustrated by curve 43', owing to the fact that said load is transmitted to the lever of the corresponding assembly through one link means 17, but said lever resists movement in direction B, C with the resiliency of the corresponding elastic means 25 plus the elastic power of the corresponding elastic means of the other assembly and the resistance to rotation of said lever increases according to curve 41' instead of according to curve 41.

The said operative feature has been proved very useful for stabilizing vehicles since each pair of coupled wheels may independently "follow" the holes of an uneven road or ground surface.

By considering again the diagram of Figure 3. it will be noticed that curve 42 representative of the own action of one elastically extensible link member 17 on wheel axle 11 rises in a much steeper manner than the curve 43 and also than curve 43' of the total elastic characteristic of the suspension. It means that supposing the arm lever in a fixed position, the provision of said link means 17 alone is to a certain extent good for resiliently supporting the vehicle body, in a spring suspension having a more "hard" characteristic. A "hard" suspension minimizes the effects of small even though deep and sharp-edged hollows which are generally encountered by the wheels on one side of the vehicle, because in such cases the shocking action on the wheels is very abrupt and the inertial mass of the vehicle body is sufficient to overcome the "hardness" of a spring suspension.

By a consideration of which above it will be further apparent that I have invented a new and improved vehicle spring suspension system which may be easily constructed according to the most various requirements of practical application, in view of the stabilizing effect related to the shock absorbing effect, by using a more or less elastically twistable material in constructing said connecting shaft 30. For example, said shaft may be constructed wholly or partly using a "spring rod" having torsional resiliency, and also by coupling said spring rod to one or both said pivotal arm levers whereby the length of the torsion member may be varied at will for obtaining desirable elastic characteristics. It will be readily understood that the lesser the torsional resistance of shaft 30 is the more the said curve 43' approaches to curve 43, said curve 43' tending to correspond to curve 43 as said torsional resistance tends to reach zero.

In Figures 4 and 5 a preferred form of embodiment of this my invention as designed for heavy tow-trucks, for example, is shown.

In Figure 4 a preferred construction of the elastically extensible link means 17 is shown. According to said construction, the said link means comprise, in combination, a first cup-shaped member 50 (shown in sectional view through the axis thereof) having a perforated bottom and two side extensions, between said extensions the upper portion of member 19 made integral with wheel axle 11 is pivotally connected at 18; a second cup-shaped member 51 (shown in side elevation in Figure 4) of like size and shape as said first member 50, arranged in opposed and co-axial relationship in respect thereto and pivotally connected at 16 to the free end of lower arm 12 of the two-armed lever; one coil spring 52 arranged in each one of said shaped members 50 and 51 (in the drawing the coil spring comprised in member 50 only is shown) and abutting at its ends on the perforated bottom of the respective member and on one disk-shaped resting member 53 freely movable within said cup-shaped member, and a connecting rod 54 to connect the disk-shaped resting member 53 abutting on the coil spring arranged into the first cup-shaped member 50 to one corresponding disk-shaped member abutting on one corresponding coil spring arranged in said second cup-shaped member 51.

In the preferred construction of an elastically extensible link means 17 as above described, the coils 52 are diametrically dimensioned so that a relatively ample spacing results between the outer surface of said coil springs and the inner surface of the cup-shaped member 50 or 51 in which said springs are arranged, respectively, and a relatively ample spacing is further provided between said inner surfaces of said cup-shaped members and the edge of said disk-shaped resting members 53.

Still further, the perforations provided in the said perforated bottoms of said cup-shaped members are larger than the diameter of said connecting rod 54, the said bottom being in effect made to provide an inner flange for abutment of one end of said coil springs 52 only. By the provision of said construction, the elastically extensible link means 17 may properly work even though the cup-members 50 and 51 are not in properly co-axial or aligned relationship, as it may very often occur in a construction of spring suspension devices for heavy and hard-working vehicles, incorrect alignment may also occur as one wheel or one pair of coupled wheels is forced to move in a different manner as the other one co-operating on same wheel axle, owing to the resulting inclination of said wheel axle in the vertical plane transversal to the vehicle body.

A construction of the elastically extensible link means 17 as referred to above and shown in Figure 4 of the accompanying drawing is substantially equivalent to the subject-matter of my U. S. Patent No. 2,623,745 wherein other embodiments or link means of like character are shown.

In Figures 4 and 5 of the accompanying drawings another embodiment of the guiding means to prevent lateral movements of the wheel axle in respect to the vehicle body is shown by way of example of a construction particularly designed for vehicle spring suspensions according to this invention and adapted for heavy vehicles. According to said other embodiment, the guiding means comprises a rigid triangular frame composed by a tubular member 55 extending transversely between and rotatively connected about its axis 56 (Figure 4) to the longitudinal beams of vehicle frame 10, and by two converging tubular members 57 made integral at one end thereof to the side portions of said member 55 and made integral at the other end thereof to a middle longitudinal member 58, and a connecting device 59 fixedly connected with the middle portion of wheel axle 11, in which connecting device the said longitudinal member 58 may freely rotate, axially move and also tilt in a vertical longitudinal plane, but not laterally move. Owing to the said connections, as the wheel axle moves in a nearly vertical plane, as it is compelled by the provision of the above described guiding means comprising connecting lever members 20 and pivotal connection 21, the middle portion thereof is compelled to travel in the vertical longitudinal middle plane of the vehicle, as the said rigid triangular frame swings about the said transversal axis 56. This construction does not limit the vertical travel of the wheel axle, neither produces lateral components nor disturbs the independency of any wheel or pair of coupled wheels co-operating on one axle in view of independent shock-absorption.

Furthermore, in Figures 4 and 5 a preferred constructive embodiment of the member 22 made integral with vehicle structure 10 and illustrated in Figures 1 and 2 in diagrammatical manner is shown. The member 22 comprises two pairs of braces 60 and 61 fixedly connected to cross-bars 62 (indicated in dotted lines) of the structure 10 of the vehicle frame at one end thereof and made integral at the other end thereof with the body of a spherical joint device of conventional character actuating the spherical connection 21 of guiding members 20 with the vehicle body or with a structural member made integral therewith.

In the form of embodiment shown, the vehicle spring suspension system is designed chiefly for tow-truck or for vehicles the wheel axle of which is constructed in form of a simple transversal bar, as illustrated at 11 in the accompanying drawing; however, it will be apparent to those skilled in the art that the features above described or equivalents thereof may advantageously be applied in vehicles other than the ones referred to above, by merely structural modifications.

It is to further be understood that the vehicle spring suspension system above described may be further improved both in its structure and in its operation, by combining the above disclosed features with other devices, features and arrangements that those skilled in the art may readily actuate by applying current knowledge. Consequently, while I have described but one constructive embodiment of this my invention the invention is not intended to be limited thereto, and such changes, modifications and further improvements relating to a device incorporating one or more of any advantageous feature or of any novel function herein disclosed would and are comprehended within the spirit and the scope of this invention.

Having thus described the invention, what I claim is:

1. An elastic suspension for a vehicle body on the wheel axle comprising in combination a two-armed lever pivotally connected to the vehicle body; an elastic member extending between, pivotally connected to and tending to draw together one of said lever arms and the wheel axle and substantially at right angles to the wheel axle; said lever being pivotable between two terminal positions where said elastic member extends in a vertical and in a horizontal direction, respectively; and an elastic means pivotally connected to the vehicle body and to the other arm of said lever and tending to rotate said lever towards the terminal position at which said elastic member extends horizontally.

2. An elastic suspension for a vehicle body on the wheel axle comprising in combination a two-armed lever pivotally connected to the vehicle body; an elastic member extending between, pivotally connected to and tending to draw together one of said lever arms and the wheel axle and substantially at right angles to the wheel axle; said lever being pivotable between two terminal positions where said elastic member extends in a vertical and in a horizontal direction, respectively; an elastic means pivotally connected to the vehicle body and to the other arm of said lever and tending to rotate said lever towards the terminal position at which said elastic member extends horizontally; and means pivotally connected to the vehicle body and rigidly connected to said vehicle axle for guiding said vehicle axle to move substantially in a vertical plane.

3. An elastic suspension for a vehicle body on the wheel axle comprising in combination a two-armed lever pivotally connected to the vehicle body; a helical spring pivotally mounted on said one lever arm and on the wheel axle and having its axis substantially at right angles to the wheel, said spring tending to draw together said one lever arm towards the wheel axle; said lever being pivotable between two terminal positions where said helical spring extends in a vertical and in a horizontal direction, respectively; an elastic means pivotally connected to the vehicle body and to the other arm of said lever and tending to rotate said lever towards the terminal position at which said helical spring extends horizontally.

4. An elastic suspension for a vehicle body on the wheel axle comprising in combination a two-armed lever pivotally connected to the vehicle body; a helical tension spring pivotally mounted on said one lever arm and on the wheel axle and having its axis substantially at right angles to the wheel, said spring tending to draw together said one lever arm towards the wheel axle; said lever being pivotable between two terminal positions where said helical spring extends in a vertical and in a horizontal direction, respectively; an elastic means pivotally connected to the vehicle body and to the other arm of said lever and tending to rotate said lever towards the terminal position at which said helical spring extends horizontally.

5. An elastic suspension for a vehicle body on the wheel axle, comprising in combination an unsymmetric two-armed lever pivotally connected to the vehicle body; an elastic member extending between, pivotally connected to and tending to draw together the longer of said lever arms and the wheel axle and arranged substantially at right angles to the wheel axle; said lever being pivotable between two terminal positions where said elastic member assumes a substantially vertical and a horizontal position, respectively; and an elastic means pivotally connected to the vehicle body and to the shorter arm of said lever and tending to rotate said lever towards the terminal position at which said elastic member assumes a substantially horizontal position.

6. An elastic suspension for a vehicle body on the wheel axle comprising in combination a two-armed lever pivotally connected to the vehicle body; an elastic member extending between, pivotally connected to and tending to draw together one of said lever arms and the wheel axle and substantially at right angles to the wheel axle; said lever being pivotable between two terminal positions where said elastic member extends in a vertical and in a horizontal direction, respectively; and an elastic means pivotally connected to the vehicle body and to the other arm of said lever and tending to rotate said lever towards the terminal position at which said elastic member extends horizontally, with a force gradually increasing as said lever approaches the last mentioned terminal position.

7. An elastic suspension for a vehicle body on the wheel axle comprising in combination a two-armed lever pivotally connected to the vehicle body; an elastic member extending between, pivotally connected to and tending to draw together one of said lever arms and the wheel axle and substantially at right angles to the wheel axle; said lever being pivotable between two terminal positions where said elastic member extends in a vertical and in a horizontal direction, respectively; an elongated member pivotally connected to the other lever arm; compressed elastic means slidably surrounding said member; an adjustable stop for said compressed elastic means near the free end of said member; and a stop means for said compressed elastic means secured to said vehicle body and being slidable on said elongated member, said elongated member being pivotably supported by said stop means.

8. An elastic suspension for a vehicle body on the wheel axle comprising in combination a lever pivotally connected to the vehicle body; an elastically extensible link pivotally connected to the free end of said lever and to the wheel axle; said lever being pivotable between two terminal positions corresponding to a vertical and a horizontal position of said link, respectively; and an elastic means connected to the vehicle body and to said lever and tending to rotate said lever towards the terminal position at which said link extends horizontally.

LUIGI PREMOLI.

References Cited in the file of this patent

UNITED STATES PATENTS

| Number | Name | Date |
| --- | --- | --- |
| 2,369,501 | Wagner | Feb. 13, 1945 |
| 2,367,817 | Brown | Jan. 23, 1945 |

FOREIGN PATENTS

| Number | Country | Date |
| --- | --- | --- |
| 404,120 | France | Oct. 11, 1909 |
| 775,996 | France | Oct. 22, 1934 |
| 807,179 | Germany | Feb. 16, 1951 |